United States Patent [19]

Wiegel

[11] Patent Number: 4,528,459
[45] Date of Patent: Jul. 9, 1985

[54] BATTERY BACKUP POWER SWITCH

[75] Inventor: Roger E. Wiegel, Toddville, Iowa

[73] Assignee: Rockwell International Corporation, El Segundo, Calif.

[21] Appl. No.: 503,215

[22] Filed: Jun. 10, 1983

[51] Int. Cl.³ .............................................. H02J 9/06
[52] U.S. Cl. ....................................... 307/66; 307/86
[58] Field of Search ................ 307/46, 48, 64, 66, 307/85, 86, 141, 141.4; 361/187

[56] References Cited

U.S. PATENT DOCUMENTS

| 3,419,779 | 12/1968 | Zehner | 320/6 |
| 3,454,781 | 7/1969 | Scholler | 307/66 |
| 4,044,268 | 8/1977 | Hammel et al. | 307/66 |
| 4,104,539 | 8/1978 | Hase | 307/66 X |
| 4,272,650 | 6/1981 | Bolgiano et al. | 307/66 X |
| 4,441,031 | 4/1984 | Moriya et al. | 307/46 X |

FOREIGN PATENT DOCUMENTS 56147 5/1979 Japan ...................................... 306/66

Primary Examiner—A. D. Pellinen
Assistant Examiner—Derek Jennings
Attorney, Agent, or Firm—Robert C. Mayes; George A. Montanye; H. Fredrick Hamann

[57] ABSTRACT

Switching apparatus for connecting a device requiring a backup power source to a battery bus upon disconnect or failure of the primary power source, without interruption of power, and without loading the backup power source when the device is off. Therefore, the apparatus provides nearly total or complete isolation of the backup source from the load when the device (load) is off.

7 Claims, 7 Drawing Figures

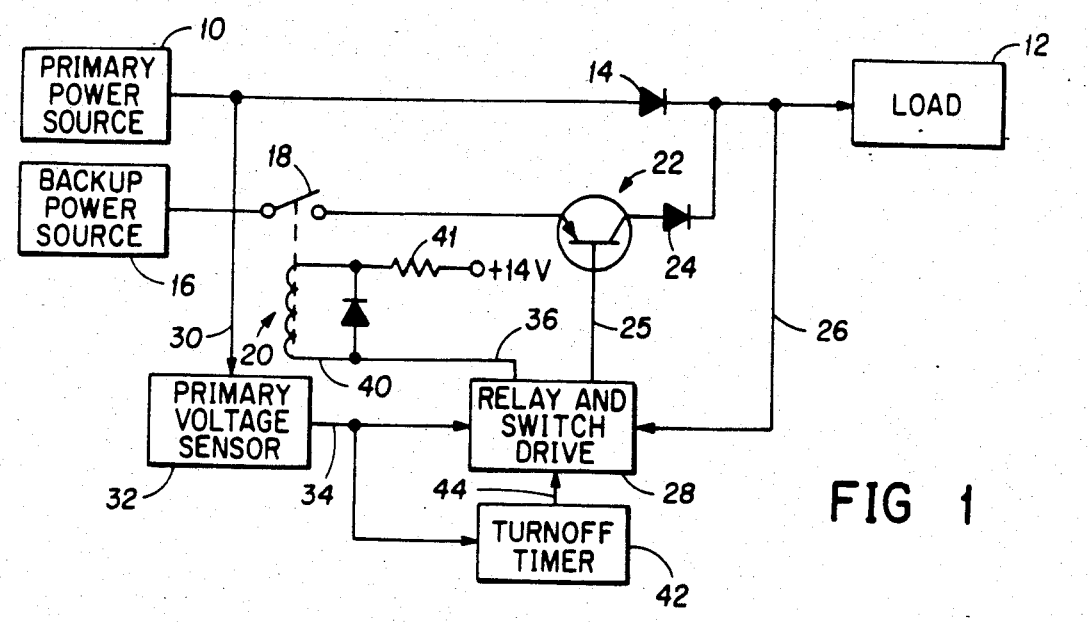

BATTERY BACKUP POWER SWITCH

BACKGROUND OF THE INVENTION

This invention relates to electrical interconnection systems, and more particularly, to a power changeover apparatus which is readily incoporated in aircraft, space vehicles and the like.

Computer controlled apparatus such as guidance systems, navigation instruments and the like require the application of backup power instantaneously, when primary power is lost, interrupted or turned off, to allow time for orderly shut-down of the apparatus. After such orderly shut-down, it is desirable that the apparatus present no load to the backup power source.

An orderly shut-down is desirable in many applications so that the logic circuits of the computer can be restored to a known state when the computer apparatus is once again powered up. This requirement is particularly desirable in avionics equipment on board aircraft or spacecraft. Additionally, multiple redundancy in computer controlled apparatus and the use of multiple redundant power supplies increases the necessity for an orderly shut-down in these applications.

Prior art power changeover systems have utilized electromechanical devices such as relays to provide isolation and changeover; however, because of mechanical limitations, such devices are incapable of providing the required instantaneous substitution of the backup power source for the failing primary power source. See, for example, U.S. Pat. Nos. 3,419,779 and 4,044,268, which are useful background and are hereby incorporated by reference. Fast electronic switches have been used in the prior art as power changeover devices, however, such devices do not provide isolation of the load from the backup power source after shut-down. See U.S. Pat. No. 3,454,781, also incorporated herein by reference thereto.

SUMMARY OF THE INVENTION

It is, therefore, an object of the invention to provide improved switching apparatus for connecting a backup power source to a load when a primary power source is disabled or turned off.

It is a more particular object of the invention to provide an improved switching apparatus for connecting a backup power source to a load which operates virtually instantaneously upon sensing loss or decay of operating voltage of a primary power source.

These and other objects, features and advantages of the invention are achieved in accordance with one aspect of the invention by providing first and second switching means in series for switching a backup power source to a load upon sensing loss of a primary power source. The first switching means comprises an electromechanical switching element actuated by the primary power source. The second switching means remains disabled until loss of power is sensed, whereupon the second switching means instantaneously switches the backup power source to the load. When backup power is turned off the second switching means is disabled, then the electromechanical switching element opens, isolating the load from the backup power source. In accordance with another aspect of the invention, there is provided a timing means for disabling both the first and second switching means, after allowing time for an orderly shut-down of the load apparatus. If primary power is restored prior to time-out of the timing means, turn-off is inhibited.

A particularly advantageous feature of the present invention is the capability of allowing the shut-down of the computer operated apparatus in a proper sequence by providing backup power for a predetermined period sufficient to allow continuous operation of the computer during shut-down.

BRIEF DESCRIPTION OF THE DRAWING

The invention is pointed out with particularity in the appended claims; however, specific objects, features, and advantages of the invention are best understood by referring to the following description of the preferred embodiment in conjunction with the accompanying drawings, in which:

FIG. 1 is a block diagram of power switching apparatus in accordance with the present invention.

FIG. 2 is a detailed schematic diagram of the circuits of FIG. 1.

FIGS. 3A–3E are timing diagrams useful in explaining the operation of the present invention.

DETAILED DESCRIPTION OF A PREFERRED EMBODIMENT

Referring now to FIG. 1, a primary power source 10 is connected to a load 12 through an isolation diode 14 connected anode-to-cathode between the primary power source 10 and the load 12. A backup power source 16 is coupled to the load 12 through a contact 18 of a relay 20 in series with electronic switch 22 and isolation diode 24. The electronic switch 22, in the presently described embodiment of the invention, is a Motorola MJE700 transistor. When primary power source 10 is operating, voltage is applied via connection 26 to the relay and switch drive circuit 28. Primary power from the primary power source 10 is also applied via connection 30 to a primary voltage sensor circuit 32. When primary power is present on connection 30, the primary voltage sensor circuit 32 generates a primary power enabled signal PPE on connection 34. The relay and switch drive circuit 28 is responsive to the PPE signal to apply a ground to connection 36, thus energizing coil 40 of the relay 20 and thereby closing relay contact 18. The relay coil 40 is connected through a 120 ohm resistor 41 to a source of regulated voltage, +14 VDC in the presently described embodiment. Closing relay contact 18 couples the backup power source 16 to the series circuit comprising contact 18 and the electronic switch 22, but does not connect power from the backup source to the load 12 until electronic switch 22 is enabled.

The primary voltage sensor circuit 32, upon sensing decay or turn-off of the voltage potential present on connection 30, disables the PPE signal on the connection 34 to the relay and switch drive circuit 28; in response to the disabled PPE signal, the relay and switch drive circuit 28 enables the electronic switch 22 thereby connecting the backup power source 16 to the system power bus.

A turn-off timer circuit 42 generates an enabling signal on connection 44 which serves to hold the relay 20 and the electronic switch 22 enabled for a predetermined period of time after the PPE signal is disabled to allow the load device 12 to effectuate an orderly shut-down. After the predetermined time period elapses, the electronic switch 22 is disabled simultaneously with removing the drive current to relay 20. The electronic switch shuts down within microseconds, and subsequently, after several milliseconds, relay contact 18 opens to isolate the load 12 from the backup power source 16.

Referring now to FIG. 2, resistors 50 and 51 comprise a voltage divider network, which (1) isolates the sensed voltage on line 30 from the control circuitry and (2) in conjunction with hysteresis resistor 54 together select turn-on and turn-off voltage thresholds. Turn-on level is approximately 21 volts and turn-off level is approximately 18 volts in this embodiment.

The primary voltage sensor circuit 32 is shown comprising the input connection 30 coupled through a 15.4k ohm resistor 50 to a non-inverting input of an operational amplifier 52. A 68.1k ohm bypass resistor 54 is connected from the non-inverting input to the output connection 34 of the operational amplifier 52. A 5.6k ohm resistor 51 is also connected from the non-inverting input of amp 52 to ground. A 5.6k ohm resistor 56 is connected from the output connection 34 to the +14 VDC source. The inverting input of the operational amplifier 52 is connected through a 4.7k ohm resistor 58 to a +5 VDC reference voltage source. The operational amplifier 52 of the presently-described embodiment is a type 139 comparator integrated circuit module.

The relay and switch drive circuit 28 includes an electronic switch enabling circuit 60 comprising an inverter circuit 61 for receiving the PPE signal on connection 34; the output of the inverter 61 is connected as one input of a two input NAND-gate 62. The output of the NAND-gate 62 is coupled through an inverter circuit 64 and a 22k ohm resistor 66 to the base of a 2N3700 NPN transistor 68. The base of the transistor 68 is connected through a 100k ohm resistor 70 to ground, the emitter is connected directly to ground, and the collector is coupled through a 3.3k ohm resistor 72 via the connection 25 to the base of the electronic switch 22 (see FIG. 1).

A relay drive circuit 80 comprises a tieback NAND bistable circuit 82 receiving an input signal on connection 84 through the inverter 61 from the primary voltage sensor circuit 32. An output signal of the bistable circuit 82 on connection 86 is coupled via a 0.01 μf capacitor 88 to parallel driver circuits 90 and 91. The input to the driver circuits 90, 91 is coupled through a 330k ohm resistor 92 to ground; the output, through diode 94 connected cathode-to-anode to the relay coil 40 (see FIG. 1) via connection 36. The output of the bistable circuit 82 is coupled via a driver circuit 96 and a 1k ohm resistor 98 to the relay coil connection 36. In the present embodiment, the inverter and driver circuits 61, 64, 90, 91, and 96, are type 4049 integrated circuit modules; the NAND-gates 62 and 82 are type 4011 integrated circuit modules.

The output of the primary voltage sensor circuit 32 is coupled via connection 34 to the turn-off timer circuit 42. The connection 34 is coupled to reset inputs of two binary counter modules 100 and 101, which in the presently-described embodiment are type 4020 integrated circuit modules. A 100 kHz signal is input to the timer on connection 102. The output of the timer circuit is coupled via an inverter circuit 104 and a connection 106 to a latch input of the bistable circuit 82, and to the NAND-gate 62 as the second input thereto. When the reset input of the counter modules 100 and 101 on the connection 34 is disabled or a low level signal, the counter modules count the 100 kHz pulses. The output signal of the turn-off timer circuit 42 on connection 106 is a high level signal until the counter modules count a predetermined number of the 100 kHz pulses.

Referring now to FIG. 3 in conjunction with FIGS. 1 and 2, a timing diagram which illustrates the operation of the circuit of FIGS. 1 and 2 is shown. FIG. 3A is the voltage input from the primary power source 10; FIG. 3E is voltage applied to the load 12. Time progresses from left to right in FIG. 3. At time T1, the primary power source 10 is enabled. It is assumed that power from the backup power source 16, which in the presently-described embodiment is a 28 VDC battery, is always present. By time T2, the input voltage has risen to a value V1 at which time the load 12 turns ON and begins operation. The relay contact 18 closes several milliseconds after time T2 as illustrated by the FIG. 3B signal. The relay 20 is actuated in response to the bistable circuit 82 of the relay drive circuit 80 being enabled by the PPE signal on connection 34. When the bistable circuit 82 is enabled, a low to high voltage transition on the connection 86 allows the paralleled drive circuits 90 and 91 to be driven by the RC network comprising the capacitor 88 and resistor 92 causing the drivers 90 and 91 to be active for a few tens of milliseconds during the relay actuation interval. After the relay 20 is actuated, the drive circuit 96 and the series resistor 98 supply relay holding current. Depending on the particular relay utilized, the actuation and holding currents can be adjusted to minimize relay power dissipation; the relay of the presently-described embodiment utilizes a 12 V 280 Ohm coil having an actuating current of 32 milliamps and a holding current of 2 milliamps after approximately 2 milliseconds. Clamping diodes internal to the drivers 90, 91, 96 serve to quickly discharge the drive capacitor 88, when power is removed. During normal operation of the load 12 under primary power from time T2 to time T3, the electronic switch 22 is not enabled because the NAND-gate 62 is held disabled (in this instance, "disabled" means a high level signal output) by the low level signal on the input connection 84. During the period from time T2 to time T3, virtually no power is drawn from the backup power source 16.

The state of the electronic switch 22 is illustrated by FIG. 3D, the high level representing the switch being disabled or off. At time T3, power from the primary power source 10 is lost and the operating voltage, FIG. 3A, falls to a value V2 which approaches the minimum operating voltage of the load device 12. During normal operation of the circuit, when the operating voltage exceeds the value V2, the PPE signal on the connection 34 is enabled or high level, coupling a low level signal on the connection 84 to hold the NAND-gate 62 disabled. Concurrently, a high level signal on the connection 106, indicating that the turn-off timer circuit 42 is either reset or has not timed out, is applied to the other input of the NAND-gate 62 conditioning the gate to be enabled. At time T4, when the operating voltage decays to the value V2, the primary voltage sensor circuit 32 disables the PPE signal on the connection 34 applying a high level signal on the connection 84 to the input of the NAND-gate 62. Concurrently, the reset signal is removed from the binary counters 100 and 101 and the turn-off timer circuit 42 begins counting. Enabling the NAND-gate 62 biases the transistor 68 ON, which in turn enables the electronic switch 22. Virtually instantaneously upon sensing loss of primary power, i.e., within nanoseconds, the enabled electronic switch 22 connects the backup power source 16 to the load device 12 and normal operation continues. At time T5, as illustrated in FIG. 3E, when the turn-off timer circuit 42 has counted the predetermined time period, about 90 seconds in the presently described embodiment, the signal on the connection 106 (FIG. 3C) goes low, resetting or unlatching the bistable circuit 82 and disabling the NAND-gate 62, which in turn disables the electronic switch 22, thereby disconnecting the backup power source 16 from the load 12. Concurrently, in response to resetting the bistable circuit 82, holding current is removed from coil 40 of relay 20 and the relay contact 18 opens several milliseconds after electronic switch 22 is disabled, isolating the load 12 from the backup power source 16. Relay 20 which isolates the load 12 from the backup power source 16 opens and closes with no load applied, thereby increasing the lifetime of the contacts 18 and allowing the use of a less expensive relay. If primary power is enabled or reapplied prior to the time-out of the turn-off timer 42, the counters 100 and 101 are reset, the electronic switch 22 is disabled, the contact 18 of the relay 20 remains closed, and the load 12 receives uninterrupted power.

The delay period generated in turn-off timer circuit 42 is selectable, and depends on the clock frequency input to the counters 100, 101 and on which of the various output-signal connections of the counter is selected for connecting to the drive circuit 80; any convenient delay period may be selected. The turn-off timer circuit 42 may be eliminated in alternate embodiments if it is desirable to leave the backup power source 16 connected indefinitely upon failure of primary power. Alternate reset means such as a manual switch 108 may be employed to disconnect the backup power source. A suitable analog timer or delay circuit is also useful if a digital clock is not available, such as a 555 timer or an RC network appropriately connected. The digital realization, however, gives a precise, repeatable timeout, and is therefor preferred.

I have disclosed an improved circuit for connecting a load to a backup power source, without drawing power therefrom until needed, and having the capability of being brought on-line essentially instantaneously upon sensing decay or loss of primary power. When primary power is removed, either intentionally or through a failure, the load remains fully powered for a predetermined period of time, allowing an orderly shut-down. After shut-down, the load device is physically disconnected from the battery bus in the exemplary embodiment described herein and presents no load to the backup power source thereafter. The backup power source cannot be connected until after the primary power is initially turned on and the backup circuit enabled.

In addition to applications wherein the present invention allows an orderly shut-down, the invention offers transient protection of short to moderate length, in for example, modems and other computer equipment. In a modem, a short loss of power can be catastrophic, causing loss of vital information, communication, and control with recovery from the transient often requiring much more time than the length of the transient causing the momentary loss of power. In this application, the timer as shown and described herein effectively differentiates between a moderate to long transient and a shut-down condition. It can be seen that the present invention is readily adapted to a variety of applications requiring a highly reliable power source.

While the principles of the invention have now been made clear in an illustrative embodiment, there will be immediately obvious to those skilled in the art many modifications of structure, arrangement, proportions, the elements, materials and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A power changeover circuit for connecting a backup power source to a load upon loss of a primary power source, comprising:
    a voltage sensor circuit connected to said primary power source, said voltage sensor circuit for generating a first output signal when primary power is enabled and a second output signal when primary power is disabled;
    a first switch coupled in series between said backup power source and said load;
    a first switch-actuating circuit responsive to said first output signal of said voltage sensor circuit for closing said first switch and coupled thereto;
    a second switch coupled in series with said first switch between said backup power source and said load, said second switch having an actuation time significantly faster than said first switch; and
    a second switch-actuating circuit responsive to said second output signal of said voltage sensor circuit and coupled thereto for closing said second switch.

2. The circuit as in claim 1, wherein said second switch is coupled between said first switch and said load.

3. The circuit as in claim 1, further comprising:
    a reset switch coupled to said first and to said second switch-actuating circuits, said reset switch for disabling said first and said second switches.

4. The circuit as in claim 1, further comprising: means coupled to aid first and said second switch-actuating circuits for disabling said first and said second switches.

5. The circuit as in claim 4, further comprising: means responsive to the second output signal of said voltage sensor circuit for delaying said disabling means for a predetermined period thereby allowing orderly shut-down of said load.

6. A power switching circuit for a load, comprising:
    a primary power source for connection to said load through a first isolation diode;
    an electronic switch connected to said load through a second isolation diode;
    a backup power source having an output;
    an electromechanical switch coupling said output of said backup power source to said electronic switch;
    a voltage sensor circuit connected to said primary power source, said voltage sensor circuit for generating a first output signal when said primary power source is enabled and a second output signal when said primary power source is disabled;
    a first drive circuit coupled to said electromechanical switch and responsive to said first output signal of said voltage sensor circuit to close said electromechanical switch; and
    a second drive circuit coupled to said electronic switch and responsive to said second output signal of said voltage sensor circuit to enable said electronic switch, thereby connecting said backup power source to said load.

7. A circuit as in claim 6 further comprising a timing circuit for controlling the duration of the connection period of said backup power source to said load, and coupled to at least one of said drive circuits.

* * * * *